(12) United States Patent
Gaarder et al.

(10) Patent No.: US 6,467,698 B2
(45) Date of Patent: Oct. 22, 2002

(54) VEHICLES CONTAINING WATER-PRODUCING FUEL CELLS, AND METHODS FOR USING WATER PRODUCED BY THE FUEL CELLS

(75) Inventors: Erik Hans Gaarder, Ann Arbor, MI (US); Gerald Ray Spradlin, Milan, MI (US); Robert Charles Borregard, Wyandotte, MI (US); Stephen Thomas Kempfer, Canton, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/761,632

(22) Filed: Jan. 17, 2001

(65) Prior Publication Data

US 2002/0092916 A1 Jul. 18, 2002

(51) Int. Cl.⁷ .................................................. B60H 1/02
(52) U.S. Cl. ..................................... 237/12.3 B; 165/41
(58) Field of Search ........................ 237/12.3 B, 12.3 R; 429/26, 120; 180/60, 65.1, 65.2; 165/42; 62/239, 391

(56) References Cited

U.S. PATENT DOCUMENTS

| | | | |
|---|---|---|---|
| 3,882,692 A | * 5/1975 | Watanabe et al. | 62/316 |
| 4,120,787 A | 10/1978 | Yargeau | |
| 4,769,297 A | 9/1988 | Reiser et al. | |
| 5,327,739 A | * 7/1994 | Ingersoll et al. | 62/78 |
| 5,366,818 A | 11/1994 | Wilkinson et al. | |
| 5,651,259 A | * 7/1997 | Twyman | 62/93 |
| 5,678,760 A | * 10/1997 | Muso et al. | 237/2 A |
| 5,723,229 A | 3/1998 | Scheifers et al. | |
| 5,863,672 A | * 1/1999 | Ledjeff et al. | 429/26 |

OTHER PUBLICATIONS

English Abstract of JP07320766 (Inventors: Hideo et al.; Published Dec. 8, 1995).
English Abstract of JP11097045 (Inventors: Mikio et al.; Published Apr. 9, 1999).

* cited by examiner

Primary Examiner—Harold Joyce
Assistant Examiner—Derek S. Boles
(74) Attorney, Agent, or Firm—Brinks Hofer Gilson & Lione

(57) ABSTRACT

A vehicle includes a fuel cell that generates electricity and water, which fuel cell includes a first end, a second end electrically coupled to the first end, and a water outlet. The water outlet of the fuel cell is connected to at least one of a washing system, a cooling system, a humidification system, and combinations thereof. In addition, a method is described for utilizing water produced by a fuel cell that includes generating water from the fuel cell, and conveying a first portion of the generated water to a component of a vehicle, which component, upon actuation, transfers a liquid comprising a portion of the first portion from the component to a point distal therefrom.

21 Claims, 4 Drawing Sheets

VEHICLES CONTAINING WATER-PRODUCING FUEL CELLS, AND METHODS FOR USING WATER PRODUCED BY THE FUEL CELLS

BACKGROUND

The present invention is directed to fuel cells. More particularly, the present invention is directed to vehicles containing fuel cells, and to methods for using water produced by these fuel cells.

The use of fuel cells as electrochemical energy conversion devices has become an increasingly studied area of technology, of particular interest in the automotive industry. Automotive applications include the use of fuel cells to replace alternators in internal combustion engines, as well as the use of full-vehicle fuel cells to completely replace internal combustion engines. In view of the potential of fuel cells to provide very low emissions, and the considerably greater energy conversion efficiency of fuel cells as compared to internal combustion engines, the number of fuel cell vehicles on the road can be expected to increase dramatically in the future (for an overview, see. *Fuel Cells: Green Power*, by Sharon Thomas and Marcia Zalbowitz, Los Alamos National Laboratory publication, LA-UR-99-3231).

Fuel cells can be constructed using a wide array of different electrolytes, Several different types of fuel cells are known, including. polymer electrolyte membrane (PEM) fuel cells, direct methanol fuel cells, alkaline fuel cells, phosphoric acid fuel cells, molten carbonate fuel cells, and solid oxide fuel cells. In spite of the chemical differences between the cells, all of these different types have in common the production of water as a byproduct from the electrochemical reaction operating in the cell.

A portion of the water generated by a fuel cell as a byproduct of the electrochemical reaction can be recycled through the fuel cell, for example, by humidifying the reactant gases entering the fuel cell (e.g., hydrogen, oxygen), and the polymer electrolyte membrane. Any water generated in excess of that needed to humidify the reactant gases and membrane is typically expelled onto the pavement under the vehicle (see, for example, U.S. Pat. No. 5,366,818). The expulsion of water onto the pavement, however, can be problematic, creating, for example, tire traction problems. In addition, when the ambient temperature falls below the freezing point of water, this method of expelling the water onto the road can lead to the formation of ice patches and, in turn, dangerous driving conditions.

Accordingly, there exists a need to develop a method for disposing of the excess water generated by fuel cells that avoids these and related difficulties.

SUMMARY

The present invention solves these problems by providing, in one embodiment, a vehicle that includes a fuel cell that generates electricity and water, and at least one component selected from the group consisting of a washing system, a cooling system, a humidification system, and combinations thereof. In general, the fuel cell has a first end, a second end electrically coupled to the first end, and a water outlet. In addition, the component is connected to the water outlet.

In another aspect, a method for using water produced by a fuel cell includes generating water from the fuel cell, and conveying a first portion of the generated water to a component of a vehicle, wherein actuation of the component transfers a liquid comprising a second portion of the generated water from the component to a point distal therefrom.

DETAILED DESCRIPTION OF THE PRESENTLY PREFERRED EMBODIMENTS

Throughout this description and in the appended claims, the phrase "fuel cell" should be understood as referring to an y type of fuel cell that generates water as a byproduct (including but not limited to the fuel cells identified above), and any combination of the various types. In addition, the phrase "fuel cell" should be understood as encompassing one or multiple individual fuel cells, and one or multiple individual "stacks" (i.e., electrically coupled combinations) of fuel cells. The phrase "byproduct water" refers to the water generated by a fuel cell, and is used interchangeably with the phrase "generated water."

Similarly, the phrases "cooling system," "washing system," and "humidification system" are well-known to those of ordinary skill in the art, and considerable variations in the parts and connectivity of parts used in these systems are possible, and lie within the scope of the appended claims and their equivalents.

Figure 1:
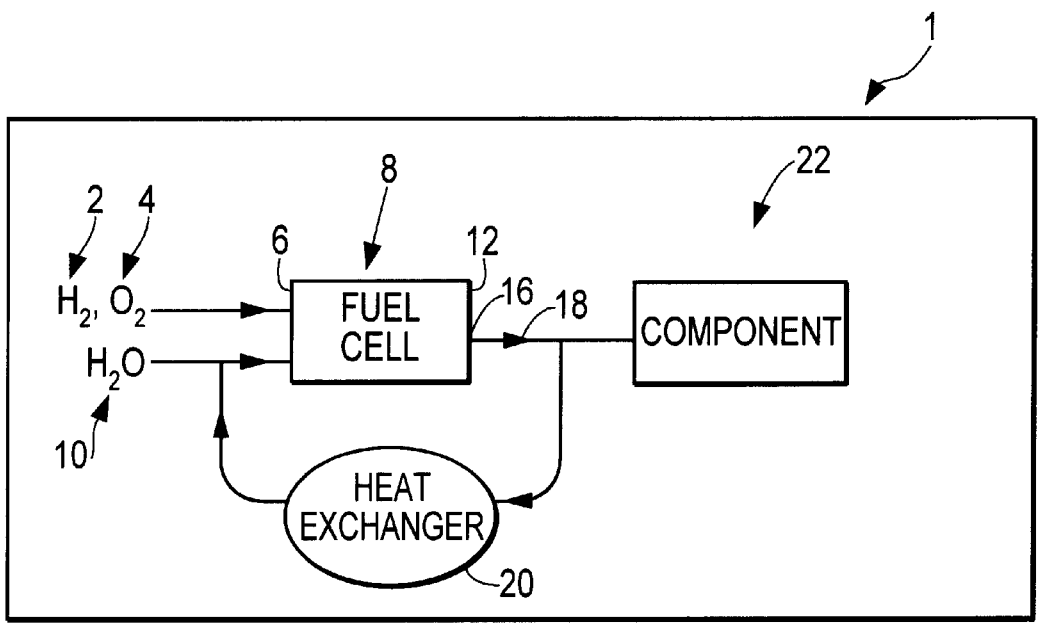
FIG. 1 is a partial view of a vehicle that includes a fuel cell connected to a generic vehicular component.

With reference to the drawings, FIG. 1 shows a first embodiment of a vehicle 1 embodying features of the present invention. Hydrogen 2 and oxygen 4 reactant gases are admitted through a first end 6 of a fuel cell 8. Water 10 may be introduced through the first end 6 to humidify the reactant gases and electrolyte membrane. A second end 12 of the fuel cell 8 is electrically coupled to the first end 6, and includes a water outlet 16 through which water generated by the fuel cell (byproduct water) 18 exits the fuel cell. A first portion of the byproduct water 18 can be brought to a desired temperature via passage through a heat exchanger 20, and reintroduced through the first end of the fuel cell 8 for the purpose of humidifying the cell. Prior to this reintroduction into the fuel cell, the water can be filtered if desired to remove particulate matter or other debris.

In a preferred embodiment of the present invention, a second portion of the byproduct water 18 can be introduced as needed to replenish the liquid level of a vehicular component 22 that is connected to the water outlet 16. Preferably, the vehicular component 22 is one that, upon actuation, transfers a liquid comprising water from the component to a point distal to the component. More preferably, the component is selected from the group consisting of a washing system, a cooling system, a humidification system, and combinations thereof. In this and embodiment and ones described hereinbelow, the liquid comprising water may optionally further comprise a concentrated anti-freeze for the purpose of preventing freezing of the liquid at low ambient temperatures.

Figure 2:
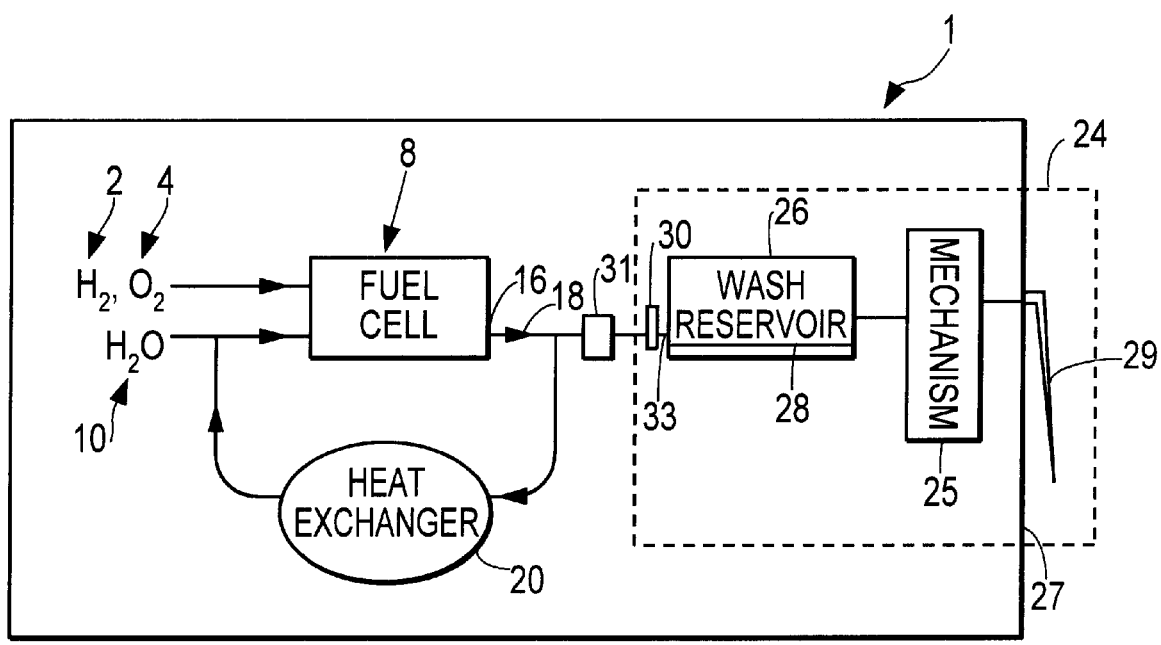
FIG. 2 is a partial view of a vehicle in which a fuel cell connected to a washing system is shown schematically.

FIG. 2 shows an embodiment of a vehicle 1 in which a fuel cell 8 is connected to a washing system 24. The washing system 24 comprises a wash reservoir 26 for containing windshield washer fluid or other liquid 28. As is customary, the wash reservoir 26 is mechanically coupled to a mechanism 25 which, upon actuation, delivers a controlled volume of washer fluid to a windshield 27. The washing system 24 may also incorporate one or more windshield wipers 29 mechanically coupled to this same mechanism to assist in the removal of washer fluid, dirt, and the like from the windshield 27.

A portion of the byproduct water 18 produced by the fuel cell 8 can be diverted to the wash reservoir 26 when the level or volume of liquid in the latter requires replenishing. For this purpose, the wash reservoir 26 is preferably equipped with a level sensor 30 for detecting a minimum liquid fill level, such that when a level of liquid in the reservoir falls below this minimum liquid fill level, the configuration of the wash reservoir 26 is such that a portion of the byproduct water 18 can be admitted therein. For example, the wash reservoir 26 may include a valve 31 interposed between the water outlet 16 of the fuel cell 8 and a water inlet 33 of the wash reservoir 26, which permits water ingress when the level of liquid in the wash reservoir 26 falls below the minimum level. A suitable control mechanism for regulating the ingress of water into wash reservoir 26 could utilize a solenoid valve, as is known in the art.

Figure 3:
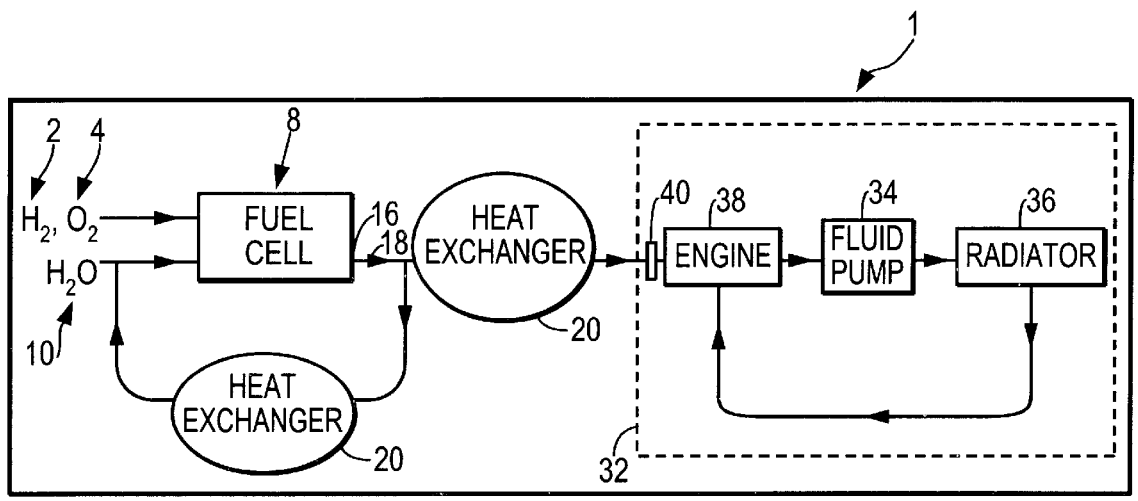
FIG. 3 is a partial view of a vehicle in which a first embodiment of a fuel cell connected to a cooling system is shown schematically.

FIG. 3 shows one embodiment of vehicle 1 in which a fuel cell 8 is connected to a cooling system 32. A cooling system of some kind is generally present in vehicles containing internal combustion engines, and can also be incorporated into full-vehicle fuel cells. A variety of different configurations for cooling systems are known in the art, and lie within the scope of the present invention. In general, a cooling system functions to remove excess heat from a vehicular component, and to release it either inside or outside of the vehicle. In the case of internal combustion engine vehicles, the cooling system removes excess heat from the engine, thereby enabling the engine to run within its most efficient temperature range, and preventing damage to the parts of the engine due to excessively high temperatures generated therein. In the case of a full-vehicle fuel cell, the cooling system can remove excess heat generated by the fuel cell and other electrical components of the system, thereby enabling the fuel cell to run within its most efficient temperature range, and extending the life of the fuel cell.

At a minimum, cooling systems generally comprise a fluid pump 34 and a radiator 36, as shown in FIG. 3. Additional elements (not shown) such as thermostats, cooling fans, expansion (overflow) tanks, and the like are well-known in the art, and are not excluded from embodiments of the present invention. Circulation of a liquid throughout a vehicular component, such as an engine 38, as shown in FIG. 3, results in the transfer of heat from the parts of the component to the liquid. The liquid is subsequently cooled via a passage through a radiator 36. A portion of the byproduct water 18 produced by the fuel cell 8 can be diverted to the cooling system 32 when the volume of cooling liquid in the latter requires replenishing. For this purpose, the cooling system is preferably equipped with a level sensor 40 for detecting a minimum liquid fill level, such that when the level or volume of cooling liquid in the system falls below this minimum liquid fill level, the cooling system 32 is configured to receive a portion of the byproduct water 18 from the water outlet 16 of the fuel cell 8. A suitable control mechanism for regulating the ingress of water into the cooling system 32 could utilize a solenoid valve, as is known in the art. Prior to entering the engine 38, fluid pump 34 or other element of the cooling system 32, the byproduct water 18 from the fuel cell 8 can optionally be brought to a desired temperature by passage through a heat exchanger 20, as shown in FIG. 2. The inclusion, exclusion, and location(s) of a heat exchanger 20 in the cooling system 32, as well as the placement of the fluid pump 34 in the cooling system 32, are variable matters that do not affect the scope of the present invention.

Figure 4:
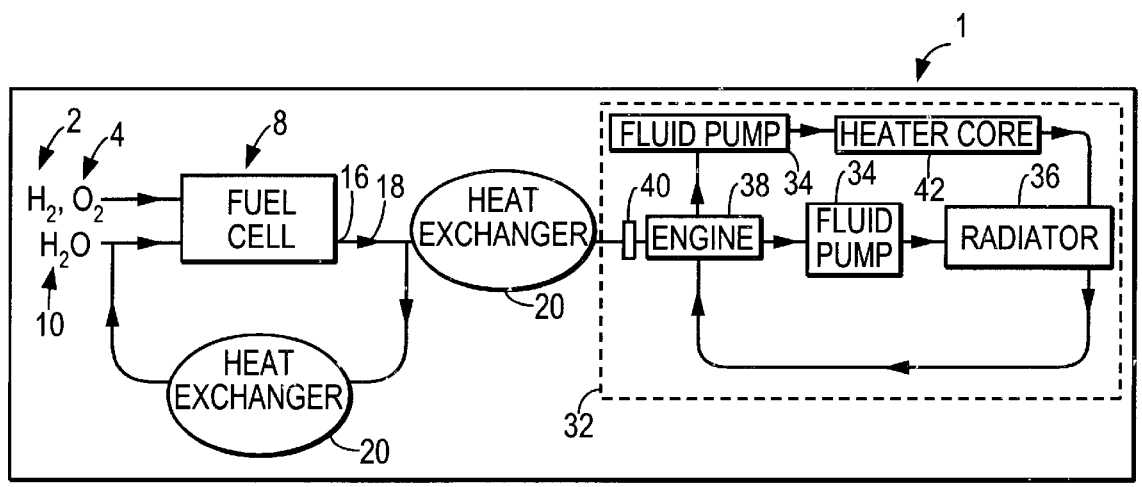
FIG. 4 is a partial view of a vehicle in which a second embodiment of a fuel cell connected to a cooling system is shown schematically.

FIG. 4 shows a second embodiment of a vehicle 1 in which a fuel cell 8 is connected to a cooling system 32. In this embodiment, the cooling system 32 further comprises a heater core 42, which is generally located inside the passenger compartment of the vehicle. A portion of the heat absorbed by the cooling liquid during its passage through the engine 38 or other vehicular component is released through the heater core 42, thereby warming the air in the interior of the vehicle. A fan or blower (not shown) in the vicinity of the heater core 42 can assist in directing this warm air to desired areas in the passenger cabin. Prior or subsequent to releasing heat through the heater core 42, the cooling liquid can be routed through the radiator 36 for cooling.

Figure 5:
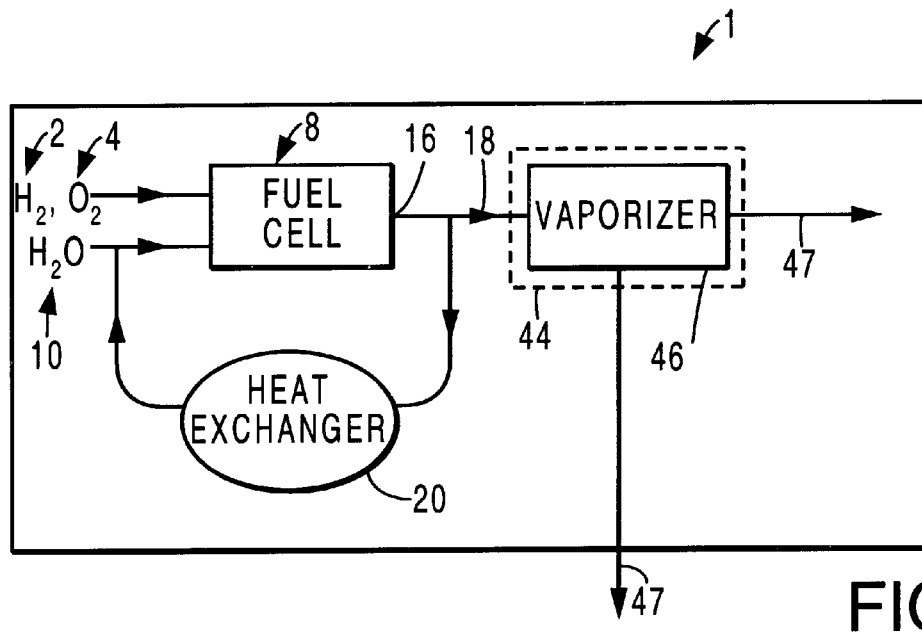
FIG. 5 is a partial view of a vehicle in which a fuel cell connected to a humidification system is shown schematically.

FIG. 5 shows a first embodiment of vehicle 1 in which a fuel cell 8 is connected to a humidification system 44. The humidification system 44 comprises a vaporizer 46, which is mechanically coupled to the water outlet 16 of the fuel cell 8. Byproduct water 18 in excess of that needed for humidifying the reactant gases and electrolyte membrane can be sent through the humidification system 44 and converted to humidity 47. The humidity 47 can then be released into the atmosphere outside of the vehicle, the interior of the vehicle, or combinations thereof.

Figure 6:
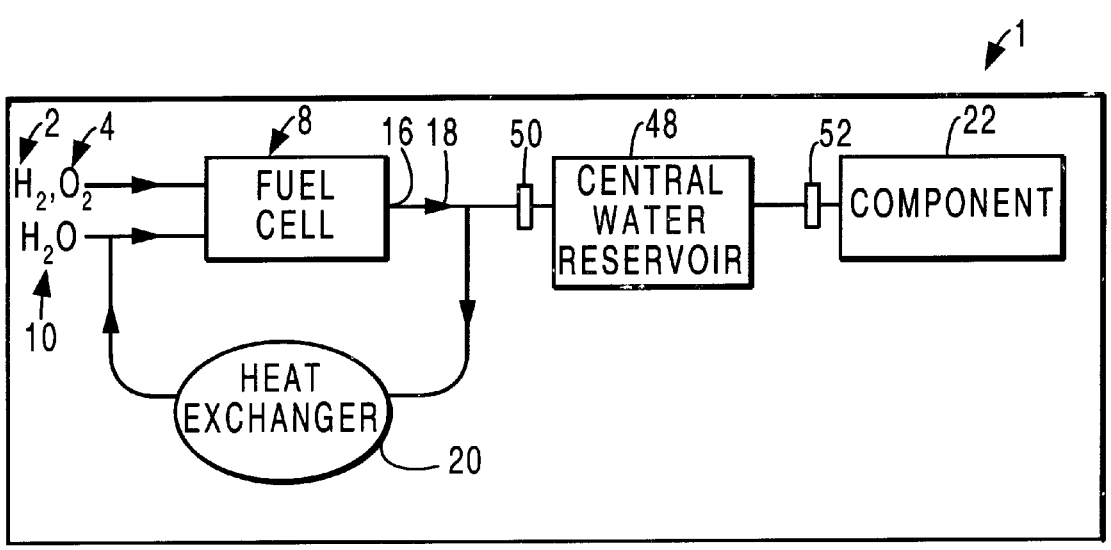
FIG. 6 is a partial view of a vehicle in which a fuel cell connected to a central water reservoir of a vehicle is shown schematically.

FIG. 6 shows one embodiment of a fuel cell 8 connected to a central water reservoir 48 of a vehicle 1. The central water reservoir 48 is connected to the water outlet 16 of the fuel cell 8 and acts as a preliminary destination for excess byproduct water 18 generated by the fuel cell 8, before delivery of portions of this water to vehicular components 22 when the liquid levels of which are in need of replenishing. Thus, for example, water in excess of that needed for humidifying the reactant gases and electrolyte membrane can be introduced into the central water reservoir 48. Preferably, the central water reservoir 48 is equipped with a level sensor 50 for detecting a minimum liquid fill level, such that when the level or volume of water in the reservoir falls below this minimum liquid fill level, the reservoir 48 is configured to receive a portion of the byproduct water from the water outlet of the fuel cell (e.g., by means of a valve, such as a solenoid valve, which opens to the ingress of water when the level of water within the reservoir falls below a certain minimum).

The central water reservoir 48 is connected to at least one or more vehicular component(s) 22, preferably, ones that, upon actuation, transfer a liquid comprising water from the component to a point distal to the component. More preferably, the component is selected from the group consisting of a washing system, a cooling system, a humidification system, and combinations thereof. The vehicular component(s) 22 connected to the central water reservoir 48 preferably is equipped with a level sensor 52 for detecting a minimum liquid fill level, such that when the level or volume of water in the component falls below this minimum liquid fill level, the component 22 is configured to receive a portion of the byproduct water 18 from the central water reservoir 48 (e.g., by a valve, such as a solenoid valve, which opens to the ingress of water when the level or volume of liquid in the component falls below the minimum).

Figure 7:
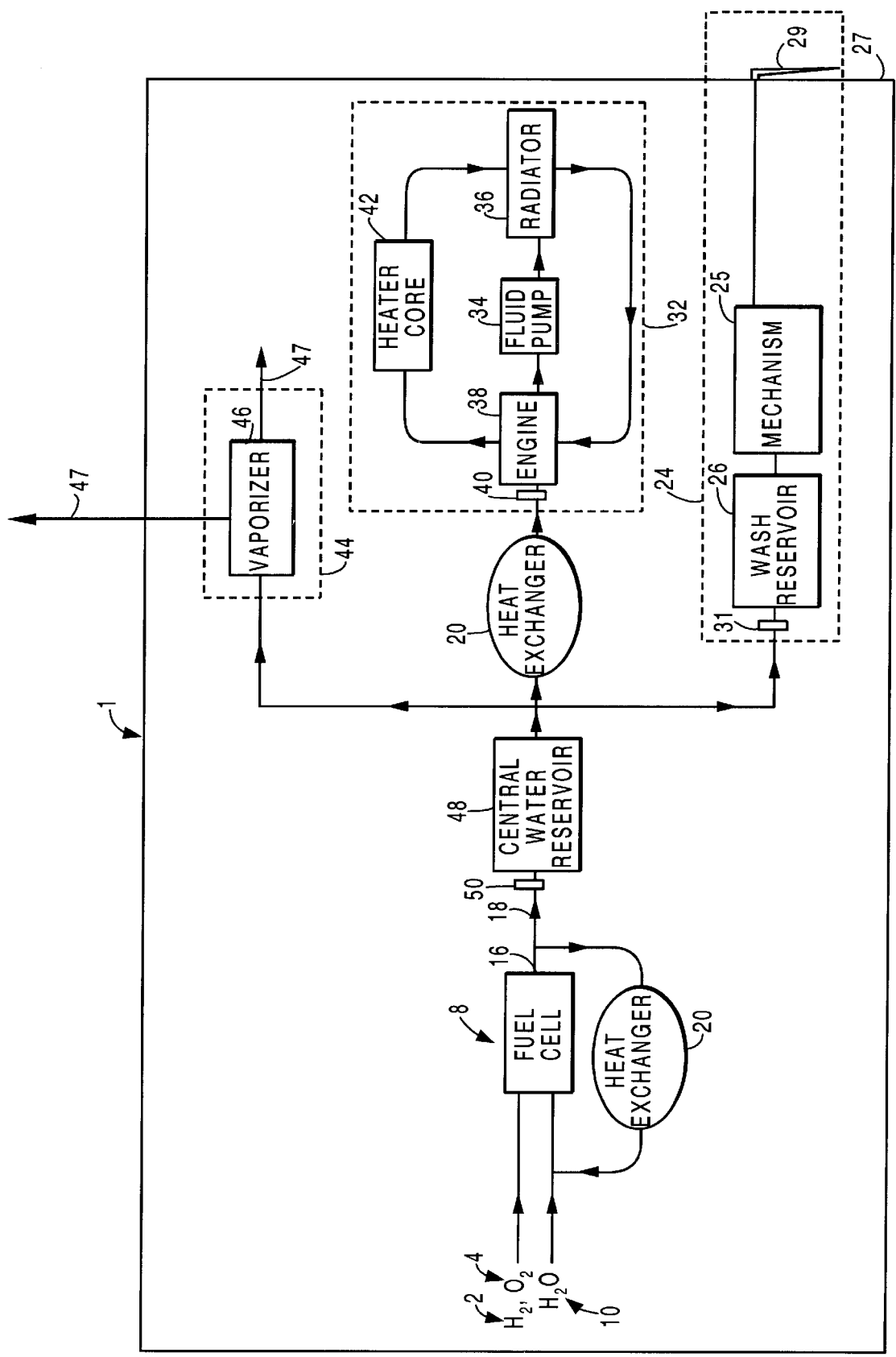
FIG. 7 is a partial view of a vehicle in which a fuel cell connected to a central water reservoir, connected in turn to each of a washing system, a cooling system, and a humidification system is shown schematically.

FIG. 7 shows another embodiment a vehicle 1 (analogous to the embodiment shown in FIG. 6) of a fuel cell 8 connected to a central water reservoir 48, which itself is connected to each of a washing system 24, a cooling system 32, and a humidification system 44. The level/volume of liquid in any of these systems—which preferably comprise minimum liquid fill levels, as described above—or in any combination of these systems, can be supplemented by a portion of water delivered from the central water reservoir 48 as needed.

The schematic diagrams shown in FIGS. 1–7 are illustrative of representative vehicles embodying features of the present invention, and are not intended as limiting examples. Considerable variation can be made in the parts of washing systems 24, cooling systems 32, and humidification systems 44, and in the number, connectivity, and placement of such parts. For example, the placement, and number of fluid pumps 34 can vary from one cooling system to another. Similarly, the inclusion and placement of heat exchangers 20 are variables. These and related variations are well-known to those of ordinary skill in the art, and fall within the scope of the appended claims and their equivalents.

In addition, although each of FIGS. 1–7 depict a portion of the byproduct water 18 produced by the fuel cell 8 as being recycled back to the first end 6 of the cell in order to humidify the reactant gases and the electrolyte membrane, the source of this humidifying water can come from elsewhere. The byproduct water produced by the cell need not be used for this purpose.

In all of the above-described and related embodiments, any portion of byproduct water 18 can be expelled into the environment either directly as a liquid or by evaporation as a gas. Thus, when vehicular component 22 and/or central water reservoir 48 have attained maximum liquid capacity (i.e., lack the requisite void volume for receiving any additional portion of water from fuel cell 8), subsequent portions of byproduct water 18 can be expelled into the environment. Preferably, such portions will be evaporated and expelled into the environment in a gaseous state. Evaporation can be accomplished using, for example, a vaporizer along the lines described above.

The water outlet 16 of the fuel cells shown in FIGS. 1–7 can be connected to various vehicular components 22 or to central water reservoir 48 using conventional hardware, such as tubing and hoses known in the art. A concentrated anti-freeze may be admixed with the water produced by these fuel cells to prevent freezing of the components and water reservoir, and the liquids contained therein.

The type of fuel cell used in vehicles embodying features of the present invention is not restricted. Preferably, the fuel cell comprises a fuel cell selected from the group consisting of a polymer electrolyte membrane fuel cell, a direct methanol fuel cell, an alkaline fuel cell, a phosphoric acid fuel cell, a molten carbonate fuel cell, a solid oxide fuel cell, and combinations thereof. More preferably, the fuel cell comprises a fuel cell selected from the group consisting of a polymer electrolyte membrane fuel cell, a direct methanol fuel cell, and combinations thereof. Still more preferably, the fuel cell comprises a polymer electrolyte membrane fuel cell.

A method for using water produced by a fuel cell embodying features of the present invention includes: generating water from the fuel cell, and conveying a first portion of the generated water to a component of a vehicle. Actuation of the component transfers a liquid comprising a second portion of the generated water from the component to a point distal therefrom. Preferably, the component is selected from the group consisting of a washing system, a cooling system, a humidification system, and combinations thereof.

A method for washing a vehicle windshield embodying features of the present invention comprises: 1 providing a washing system that includes a wash reservoir; 2 generating water from a fuel cell; 3 conveying a first portion of the generated water to the wash reservoir; and 4 actuating the washing system, thereby transferring a liquid comprising a second portion of the generated water to the windshield. Preferably, the washing system includes at least one windshield wiper, selected from any of the various windshield wipers known in the art, including but not limited to single speed wipers, multi-speed wipers, and intermittent wipers. In a preferable embodiment, a windshield wiper or wipers can be used to wipe a portion of the liquid from the windshield. However, in alternative embodiments, the liquid can be removed from the windshield by hand e.g., using a cloth, or by either of natural e.g., wind or mechanical e.g., blower air-drying.

A method for cooling a vehicle embodying features of the present invention comprises: 1 providing a cooling system that includes a radiator, a fluid pump, and optionally, a heater core, but does not exclude other conventional elements of cooling systems, such as thermostats, cooling fans, expansion overflow tanks, and the like; 2 generating water from a fuel cell; 3 conveying a first portion of the generated water to the cooling system; 4 circulating a liquid by means of the fluid pump, wherein the liquid comprises a second portion of the generated water; and 5 cooling the liquid by passing the liquid through the radiator. In a related and alternative embodiment, the act of transferring heat from the liquid being circulated through a heater core located in the passenger compartment of the vehicle can be included, thereby providing a method for heating an interior of a vehicle in accord with the present invention.

A method for humidifying water embodying features of the present invention comprises: 1 providing a vehicle that includes a humidification system; 2 generating water from a fuel cell; 3 conveying a first portion of the generated water to the humidification system; 4 vaporizing a second portion of the generated water; and 5 expelling a third portion of the generated water as humidity into an environs selected from the group consisting of an interior of the vehicle, an atmosphere exterior to the vehicle, and a combination thereof.

The foregoing detailed description has been provided by way of explanation and illustration, and is not intended to limit the scope of the appended claims. Many variations in the presently preferred embodiments illustrated herein will be obvious to one of ordinary skill in the art, and remain within the scope of the appended claims and their equivalents.

What is claimed is:

1. A vehicle comprising:
 a fuel cell that generates electricity and water, comprising:
 a first end;
 a second end electrically coupled to the first end; and
 a water outlet; and
 at least one component selected from the group consisting of a washing system, a cooling system, a humidification system, and combinations thereof, wherein the component is connected to the water outlet.

2. The vehicle of claim 1 wherein the washing system comprises:

a wash reservoir comprising a minimum liquid fill level, such that when a liquid level in the wash reservoir is below the minimum liquid fill level, the wash reservoir is configured to receive a portion of water from the water outlet.

3. The vehicle of claim 1 wherein the cooling system comprises:

a fluid pump mechanically coupled to the water outlet;

a radiator mechanically coupled to each of the fluid pump and the water outlet; and a minimum liquid fill level, such that when a liquid level in the cooling system is below the minimum liquid fill level, the cooling system is configured to receive a portion of water from the water outlet.

4. The vehicle of claim 3 wherein the cooling system further comprises a heater core, wherein the heater core is located within an interior of the vehicle, and wherein the heater core is mechanically coupled to each of the fluid pump and the water outlet.

5. The vehicle of claim 1 wherein the humidification system comprises:

a vaporizer mechanically coupled to the water outlet, the vaporizer being configured for expelling a portion of the water outlet as humidity into an environs selected from the group consisting of an interior of the vehicle, an atmosphere exterior to the vehicle, and a combination thereof.

6. The vehicle of claim 1 wherein the fuel cell comprises a fuel cell selected from the group consisting of a polymer electrolyte membrane fuel cell, a direct methanol fuel cell, an alkaline fuel cell, a phosphoric acid fuel cell, a molten carbonate fuel cell, a solid oxide fuel cell, and combinations thereof.

7. The vehicle of claim 1 wherein the fuel cell comprises a polymer electrolyte membrane fuel cell.

8. The vehicle of claim 1 further comprising:

a central water reservoir mechanically coupled to the water outlet and to the component, wherein the central water reservoir comprises:

a minimum water fill level, such that when a water level in the central water reservoir is below the minimum water fill level, the central water reservoir is configured to receive a portion of water from the water outlet.

9. The vehicle of claim 8, wherein the central water reservoir further comprises:

a maximum water fill level, such that when the water level in the central water reservoir is at the maximum water fill level, the portion of water from the water outlet is expelled into an atmosphere exterior to the vehicle.

10. The vehicle of claim 8 wherein the component comprises a minimum liquid fill level, such that when a liquid level in the component is below the minimum liquid fill level, the component is configured to receive a portion of water from the central water reservoir.

11. The vehicle of claim 8 wherein the fuel cell comprises a fuel cell selected from the group consisting of a polymer electrolyte membrane fuel cell, a direct methanol fuel cell, an alkaline fuel cell, a phosphoric acid fuel cell, a molten carbonate fuel cell, a solid oxide fuel cell, and combinations thereof.

12. The vehicle of claim 8 wherein the fuel cell comprises a polymer electrolyte membrane fuel cell.

13. A method for using water produced by a fuel cell, the method comprising:

generating water from the fuel cell; and conveying a first portion of the generated water to a component of a vehicle, wherein actuation of the component transfers a liquid comprising a second portion of the generated water from the component to a point distal therefrom.

14. The method of claim 13 wherein the fuel cell comprises a fuel cell selected from the group consisting of a polymer electrolyte membrane fuel cell, a direct methanol fuel cell, an alkaline fuel cell, a phosphoric acid fuel cell, a molten carbonate fuel cell, a solid oxide fuel cell, and combinations thereof.

15. The method of claim 13 wherein the fuel cell comprises a polymer electrolyte membrane fuel cell.

16. The method of claim 13 wherein the component is selected from the group consisting of a washing system, a cooling system, a humidification system, and combinations thereof.

17. The method of claim 16 further comprising:

providing a washing system that includes a wash reservoir pump and a windshield wiper;

conveying the first portion of the generated water to the wash reservoir;

actuating the washing system, thereby transferring the second portion to the windshield; and using the windshield wiper to wipe at least some of the second portion of the liquid from the windshield.

18. The method of claim 16 further comprising:

providing a cooling system that includes a radiator and a fluid pump;

conveying the first portion of the generated water to the cooling system;

circulating a liquid by means of the fluid pump, wherein the liquid includes the second portion of the generated water; and cooling the liquid by passing the liquid through the radiator.

19. The method of claim 16 further comprising:

providing a cooling system that includes a fluid pump and a heater core;

conveying the first portion of the generated water to the cooling system;

circulating a liquid by means of the fluid pump, wherein the liquid includes the second portion of the generated water; and transferring heat from the liquid to an interior of a vehicle by means of the heater core.

20. The method of claim 16 further comprising:

providing a vehicle that includes a humidification system;

conveying the first portion of the generated water to the humidification system;

vaporizing the second portion of the generated water; and expelling a third portion of the generated water as humidity into an environs selected from the group consisting of an interior of the vehicle, an atmosphere exterior to the vehicle, and a combination thereof.

21. A method for using water produced by a fuel cell, comprising:

generating water from the fuel cell; and conveying a portion of the water to a component of a vehicle selected from the group consisting of a washing system, a cooling system, a humidification system, and combinations thereof.

* * * * *